(12) United States Patent
Aoki

(10) Patent No.: US 7,502,200 B2
(45) Date of Patent: Mar. 10, 2009

(54) INFORMATION RECORDING AND REPRODUCING UNIT

(75) Inventor: Makoto Aoki, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 483 days.

(21) Appl. No.: 11/316,468

(22) Filed: Dec. 21, 2005

(65) Prior Publication Data

US 2006/0139795 A1    Jun. 29, 2006

(30) Foreign Application Priority Data

Dec. 27, 2004    (JP) .............................. 2004-378292

(51) Int. Cl.
*G11B 17/02*    (2006.01)
(52) U.S. Cl. .................................. 360/97.01
(58) Field of Classification Search ........................ None
See application file for complete search history.

(56) References Cited

U.S. PATENT DOCUMENTS

| | | | |
|---|---|---|---|
| 5,995,321 A * | 11/1999 | Ishida ...................... | 360/97.01 |
| 6,160,967 A | 12/2000 | Mizobuchi | |
| 2002/0145822 A1* | 10/2002 | Kuwajima et al. ........ | 360/97.01 |
| 2003/0026037 A1* | 2/2003 | O'Sullivan et al. ........ | 360/97.01 |
| 2004/0156146 A1* | 8/2004 | Nakano et al. ............ | 360/264.2 |

FOREIGN PATENT DOCUMENTS

| JP | 11-249215 | 9/1999 |
|---|---|---|
| JP | 2002-359915 | 12/2002 |
| JP | 2003-309365 | 10/2003 |

* cited by examiner

*Primary Examiner*—Mark Blouin
(74) *Attorney, Agent, or Firm*—Blakely, Sokoloff, Taylor & Zafman LLP

(57) ABSTRACT

In a circuit device of this invention, a support base member, which holds an electronic component and circuit for supplying a control signal to a rotating carriage, is formed integrally with a carrier member via a plurality of cutting areas which are to be cut out from the carrier member, in order to provide an FPC, connected electrically to the carriage, with such a height which enables the FPC to be displaced on a same plane as a plane in which the carriage rotates or a plane parallel to the plane in which the carriage rotates. The cutting area is folded and overlapped at a predetermined position in a state in which the support base member is cut out by punching so as to provide a predetermined height.

7 Claims, 4 Drawing Sheets

INFORMATION RECORDING AND REPRODUCING UNIT

CROSS-REFERENCE TO RELATED APPLICATIONS

This application is based upon and claims the benefit of priority from prior Japanese Patent Application No. 2004-378292, filed Dec. 27, 2004, the entire contents of which are incorporated herein by reference.

BACKGROUND

1. Field

The present invention relates to an information recording and reproducing unit for recording information into a disc-like recording medium and reproducing information from the recording medium, and a circuit unit for use therein.

2. Description of the Related Art

In recent years, a magnetic disk unit (HDD) and an information recording and reproducing unit (disk unit) which uses an optical disk unit or the like as its recording medium have been widely used as an external recording unit for a computer or an image recording unit.

For example, a magnetic disk unit has a magnetic disk as a magnetic recording medium, a recording and reproducing head for writing information into the magnetic disk and reading out information from the magnetic disk, a carriage for moving the recording and reproducing head to an arbitrary position in the radial direction of the magnetic disk, a drive unit for moving the carriage and a drive circuit for supplying control signals corresponding to an amount for moving the carriage to the drive unit, these components being accommodated in a rectangular casing.

Recently, a further reduction in size has been accelerated in a magnetic disk unit in order to use this magnetic disk unit as a recording device for various kinds of electronic appliances, particularly, smaller electronic appliances. For example, in a magnetic disk unit of 1 inch or more in the diameter of disk, printed circuit boards to be disposed on the surface of its casing such that they overlap can be reduced to be smaller than the area of the casing surface.

However, in the magnetic disk unit of less than 1 inch in diameter of disk, its printed circuit board needs to be reduced in size in accordance with a reduction in size of its casing. Thus, an installation space on the printed circuit board is reduced so that it becomes difficult to mount a plurality of electronic parts.

For the reason, a method of overlapping a printed circuit board by folding at a predetermined position has been proposed.

Meanwhile, Jpn. Pat. Appln. KOKAI Publication No. 11-249215 describes a proposal for preventing components mounted on a circuit board from contacting each other when the printed circuit board is overlapped by folding back.

However, when a flat cable for use in electrical connection to other parts connected to the printed circuit board is deformed in accordance with displacement of a control object, it is demanded that components within the printed circuit board do not make contact with each other and the flat cable does not affect the displacement of the control object.

There is no description relating to a flat cable or a displacement of the control object in the aforementioned publication.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinafter, a preferred embodiment of the present invention will be described with reference to the accompanying drawings.

Figure 1:
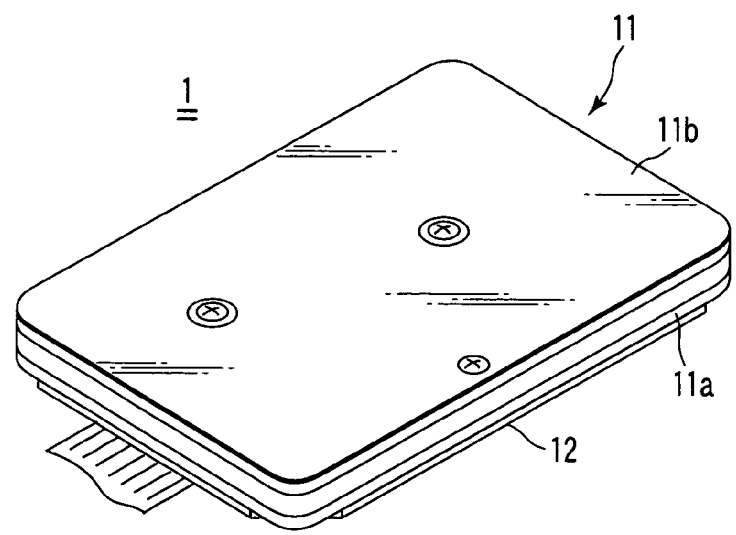
FIG. 1 is a schematic view showing an example of a hard disk drive unit to which the present invention is applied.

FIG. 1 schematically shows a deflection yoke unit to which the present invention is applied, showing an example of an information recording and reproducing unit, or a hard disk drive unit (HDD), of the present invention.

As shown in FIG. 1, a hard disk drive unit (HDD) 1 includes a substantially rectangular casing 11 constituted of a bottom casing (first shell) 11a which accommodates various elements described later with reference to FIG. 2 and a lid-like casing (second shell) for covering the bottom casing 11a, and a control circuit substrate 12 overlaid on the outside face of the casing 11, namely, the rear face of the bottom casing 11a. The first shell (bottom casing) 11a and the second shell (lid-like casing) 11b are sealed with an airtight structure (not shown) in order to prevent foreign matter such as dust and dirt from entering inside.

Figure 2:
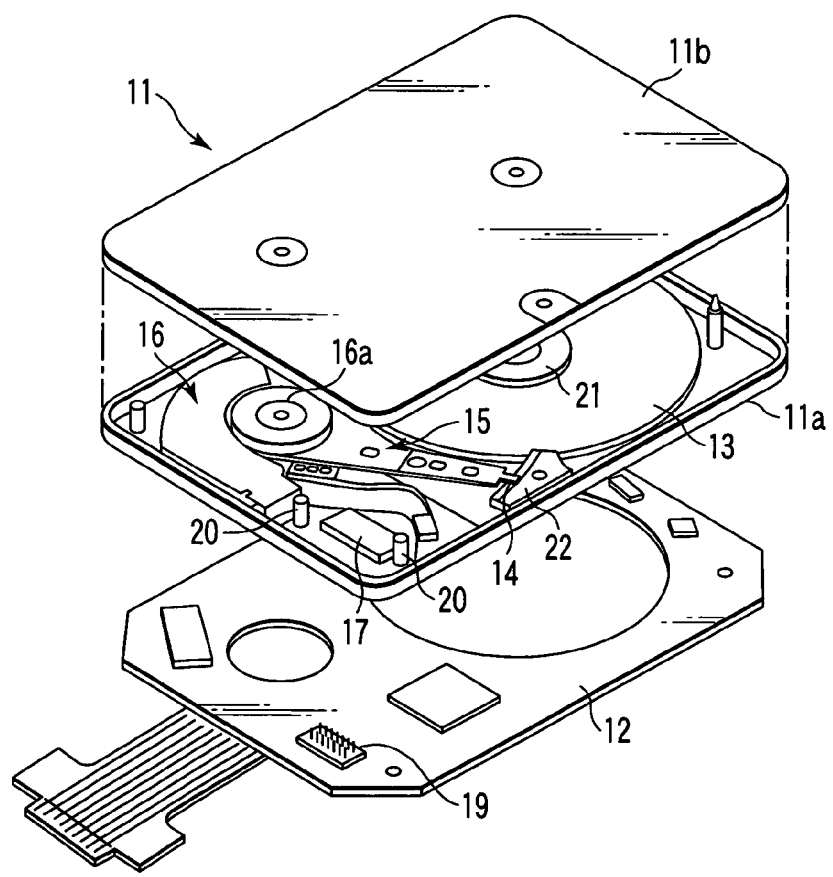
FIG. 2 is a schematic view for explaining components of the hard disk drive unit shown in FIG. 1.
Figure 3:
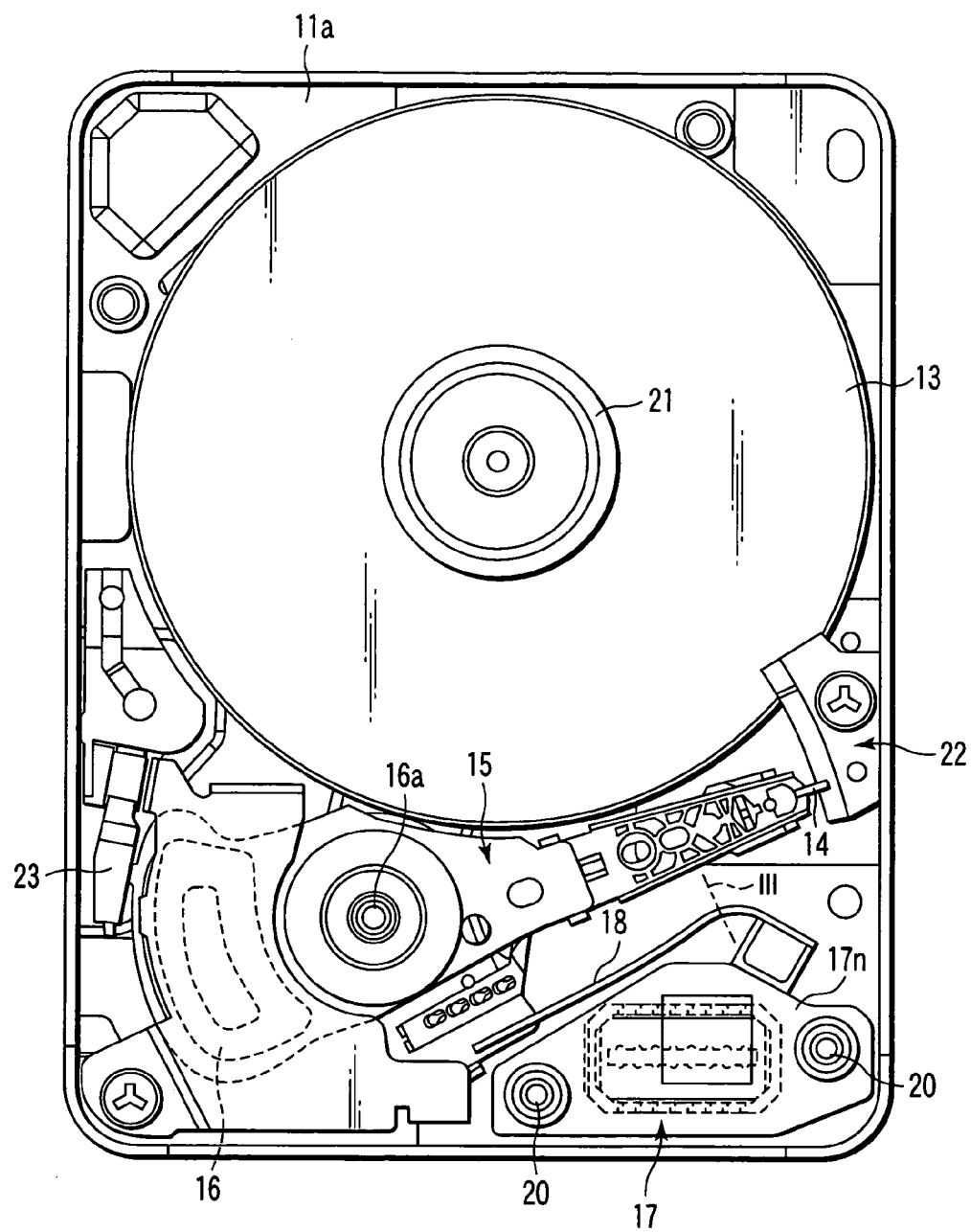
FIG. 3 is a schematic view for explaining the interior of the hard disk drive unit shown in FIG. 1.

As shown in FIGS. 2, and 3, the casing 11 contains a magnetic disk (hard disk) 13 which is a disk-like recording medium whose diameter is 21.6 mm (0.85 inches) and whose capacity per unit is about 2 gigabytes (GB), and a recording and reproducing head 14 which records information into the hard disk 13 or reproduces information from the hard disk 13. In the meantime, the recording and reproducing head 14 is provided at an end of a carriage 15 which holds the head 14 so as to be rotatable along a plane of the hard disk 13. The carriage 15 is fixed at a supporting point 16a of a coil motor (carriage drive unit, which is hereinafter referred to as VCM) 16. Therefore, the recording and reproducing head 14 is moved to an arbitrary position in the radius direction of the disk 13 so as to record information into the disk or reproduce information from the disk.

A carriage drive circuit 17 for controlling an amount by which the carriage 15 is moved, namely an operation of the VCM 16 to rotate the carriage 15, is connected to the side of the supporting point of the carriage 15 via a carriage FPC (connecting medium) 18.

The carriage drive circuit 17 includes a support base member 17a which is formed of a flexible thin plate, such as stainless, an electronic component group (without a reference numeral) mounted on the support base member 17a, which will not be described in detail, a circuit board (not shown) which acts as part of the carriage FPC 18 while being used for electrically connecting an electronic component group with the recording and reproducing head 14 and the VCM 16 and the like. The thickness of the stainless thin plate is, for example, 50 μm and substantially sheet-like. The electronic component group includes an electronic component such as a drive IC, which is used as a control unit for controlling the operation of a memory unit or the recording and reproducing head 14 in which protocol and the like relating to signal processing or exchange of signals with a signal supply unit or a signal output destination, a contact used for connecting between individual electronic components or with outside, an interface and the like.

The carriage FPC 18 is connected to the support base member 17a of the carriage drive circuit 17. A connecting end 18a for use in connecting the carriage 15 with the carriage FPC 18 is provided at an end portion on an opposite side to the carriage FPC 18.

The carriage drive circuit 17 is connected to a terminal (connecting terminal group) 19 provided at a predetermined position of the control circuit substrate 12 on the rear face of the bottom casing 11a. The carriage drive circuit 17 is positioned at a predetermined position of the bottom casing 11a by a supporting post 20 provided on the bottom casing 11a.

The casing 11 includes a turn table (disk motor) 21 provided on a rotation shaft of a motor (not seen because it is hidden by the hard disk 13), supporting the hard disk 13 so as to be rotatable at a predetermined speed, a motor drive circuit for controlling rotation/stop and rotation speed of the disk motor (turn table) 21, which will not be described in detail, and the like, internally.

Further, the casing 11 includes: a lamp load mechanism 22 which makes the recording and reproducing head 14 on standby in a state unloaded from a loading state enabling recording of information into the hard disk 13 or reproduction of information from the disk 13; and a latch mechanism 23 which locks the head 14, namely the carriage 15, at a retraction position at non-operation time when no recording operation to the hard disk 13 or reproduction operation from the hard disk 13 occurs.

Figure 4:
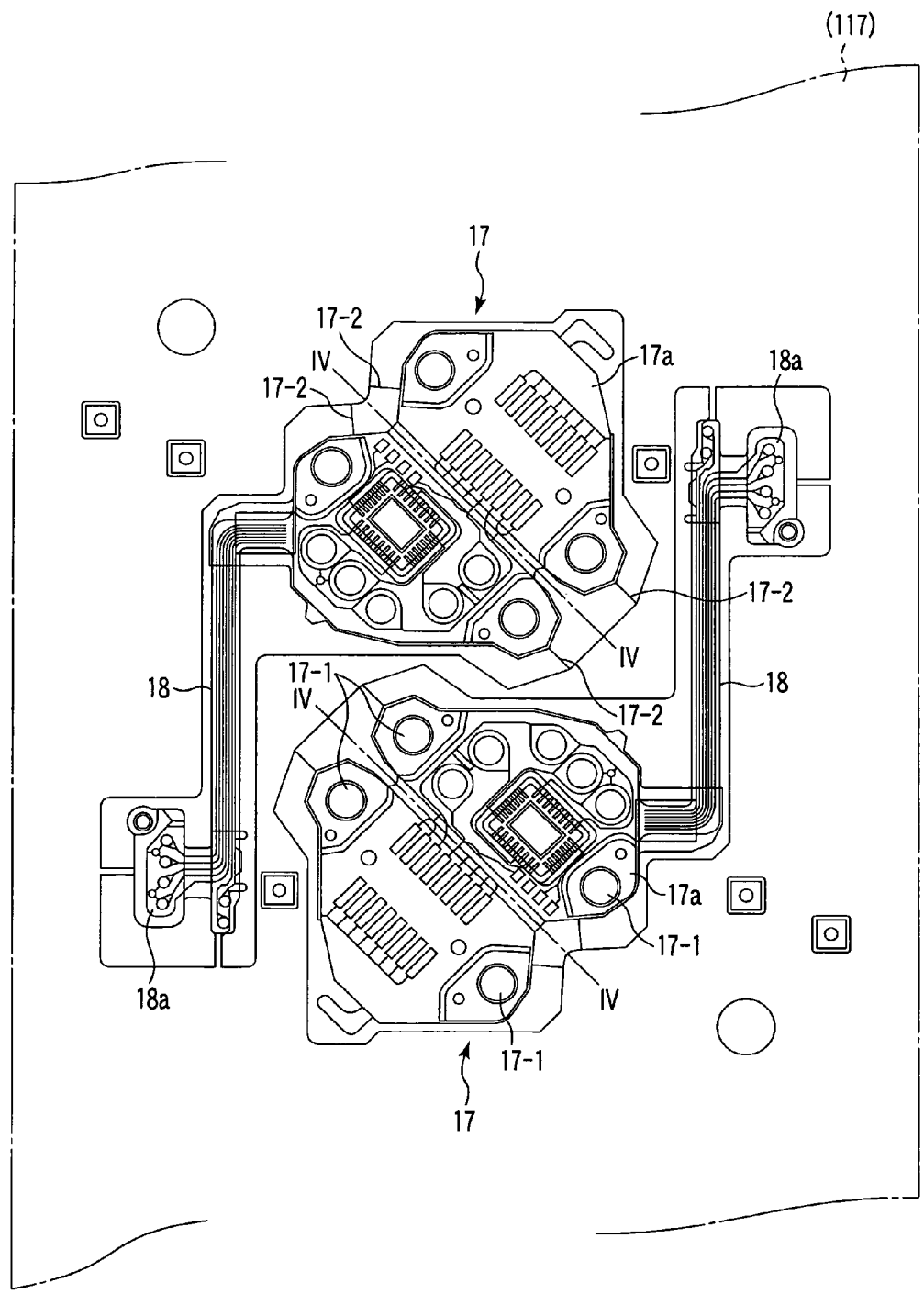
FIG. 4 is a schematic view for explaining a state in which a carriage drive circuit and a carriage FPC built in the hard disk drive unit shown in FIG. 1 are developed (supported by a carrier member)
Figure 5:
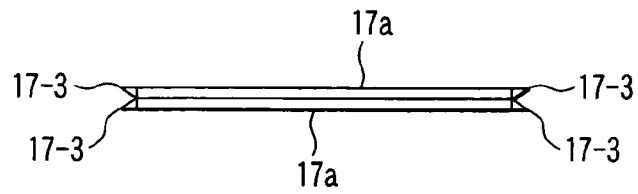
FIG. 5 is a schematic view for explaining a burr which is generated on a support base member of the carriage drive circuit shown in FIG. 4.

FIG. 4 shows a state in which the carriage drive circuit and carriage FPC described with FIGS. 2 and 3 are developed.

The support base member 17a of the carriage drive circuit 17 is, for example, a thin plate made of stainless and a plurality of detents (positioning holes) 17-1, which are positioned with respect to the supporting post 20, are formed thereon.

The support base member 17a is actuated in a state in which it is bent along the line IV-IV so as to overlap itself. FIG. 3 shows a state in which the support base member 17a is set within the casing 11 such that it is bent and overlapped (folded). Therefore, it can be recognized that the support base member 17a is in a laminated state from the quantity and position of the supporting post 20 and the positioning hole 17-1.

As described previously, insulating thin film (not shown) are interposed selectively in the support base member 17a or it is supplied with insulation characteristic selectively by forming an end portion of the carriage FPC 18 integrally. As a consequence, the support base member 17a can hold an electronic component group such as the aforementioned memory unit or a drive IC at a predetermined position in a state in which electric conduction and insulation are ensured (the electronic component group is installed at a predetermined position of the support base member 17a).

The support base member 17a of the carriage drive circuit 17 receives a pressure from the terminal (connecting terminal group) 19 when the control circuit board 12 and the casing 11 are assembled with the support base member 17a set within the casing 11. Although this pressure is an undesired force applied to the electronic component group including the memory unit, drive IC and the like and is a cause which generates a partial peeling in a connection portion with the carriage FPC 18, an influence of this pressure is reduced because the stiffness of the support base member 17a is intensified by bending and overlapping the support base member 17a as described above.

The support base member 17a of the carriage drive circuit 17 is formed into a predetermined shape by punching a sheet-like stainless material (thin plate) considering its size and automatization of installation thereof with an automatic installing unit, and two or more are supplied continuously.

That is, the support base member 17a is supplied in a state just before it is punched completely from the carrier member such that it is held by a hanging portion (connecting area left in an interspace with the sheet-like carrier member to prevent the support base member 17a from dropping when it is punched out with a die).

Thus, in a state in which the support base member 17a is cut out form the carrier member before folding shown in FIG. 4, part of the hanging portion 17-2 can be left as burr on the support base member 17a.

It has been known that this burr varies in size depending on the frequency of use of a die (blade) when the support base member 17a is separated (cut) from the carrier member. Thus if the support base member 17a of the carrier member is folded and overlapped along the bending position indicated with the dot line IV-IV in FIG. 4, the thickness after the overlapping (folding) changes depending on the degree of the burr.

To completely eliminate a remainder of the hanging portion 17-2 (which is hereinafter called remainder of burr (17-3) of burr), which can cause burr, it is demanded to remove the burr at other process after the punching with the die or to increase the frequency of maintenance of the die blade.

If the thickness after overlapping the support base member 17a of the carriage drive circuit 17 varies due to a difference in size of the burr at the time of cutting, there is generated a cause which changes a stress undesirably, for example, for twisting of the FPC 18 when the FPC 18 is displaced by a rotation of the carriage 15 (moved in a direction indicated with an arrow III in FIG. 3), when the carriage FPC 18 is connected so that the connecting end 18a of the FPC 18 is connected to the carriage 15.

That is, if, when the carriage FPC is displaced following a rotation of the carriage 15, the carriage 15 is displaced only on a same plane as a plane in which the carriage 15 rotates or the carriage 15 is displaced only on a plane parallel to a plane in which the carriage 15 rotates, no undesired stress (twisting) is generated in the FPC 18. On the contrary, it is indicated that if, when the carriage FPC 18 is displaced following a rotation of the carriage 15, there is a component perpendicular to the axis of rotation (the height differs between displacements), a stress which obstructs the rotation of the carriage 15 is generated.

In the meantime, the carriage FPC 18 in the state shown in FIG. 3 indicates that the FPC 18 connected to a predetermined position of the support base member 17 shown in FIG. 4 is used in a state in which it is bent at about 90° in a displacement interval between the support base member 17a and the carriage 15 when the HDD 1 is assembled. Thus, the direction indicated with the arrow III in FIG. 3 indicates a state (direction) in which the curvature changes when the FPC 18 is displaced.

It should be rated that, a relation indicated below in Table is recognized between the size of the remainder of burr (17-3) of burr which can be a cause for burr and the frequency of use of a punching blade. Numerals 1-6 as the hanging position in Table indicate positions [1]-[6] in FIG. 4, corresponding to the hanging portions 17-2 mentioned in this specification.

lapped (that is, deflecting the phases of the hanging portions 17-2), the necessity of considering an influence of the remainder of burr (17-3) of burr left when the support base member 17a is cut from the carrier member 117 is eliminated. As a consequence, the frequency of maintenance of the punching blade (die) can be reduced.

Figure 6:
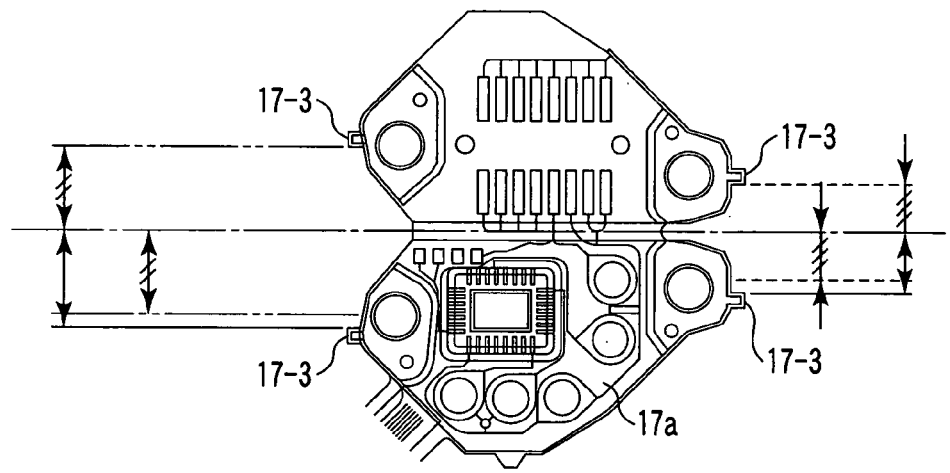
FIG. 6 is a schematic view for explaining an example for optimizing the position of the remainder of the support base member of the carriage drive circuit shown in FIG. 4.

Further, by setting the positions of the hanging portions 17-2 so that the remainders adjoin each other when the support base member 17a is folded and overlapped as shown in FIG. 6, the positional accuracy when folding the support base member 17a (in a direction perpendicular to a bending position indicated with the dot line IV-IV in FIG. 4) is improved.

By the way, it has been demanded to reduce the thickness of the support base member 17a of the carriage drive circuit 17 in accordance with a demand for further reduction in size and thickness of the hard disk drive (HDD) unit.

On the other hand, if the thickness of the support base member 17a, namely, a sheet-like carrier member is reduce

TABLE

Unit: μm

| | Hanging position | | | | | | | | | | | |
|---|---|---|---|---|---|---|---|---|---|---|---|---|
| | 1 | | 2 | | 3 | | 4 | | 5 | | 6 | |
| | Remainder of burr | Burr | Remainder of burr | Burr | Remainder of burr | Burr | Remainder of burr | Burr | Remainder of burr | Burr | Remainder of burr | Burr |
| 1 | 29 | 9 | 5 | 4 | 17 | 4 | 13 | 10 | 36 | 10 | 21 | 7 |
| 2 | 21 | 8 | 13 | 5 | 15 | 6 | 15 | 9 | 32 | 6 | 25 | 8 |
| 3 | 23 | 4 | 11 | 6 | 17 | 7 | 18 | 8 | 32 | 7 | 28 | 7 |
| 4 | 22 | 6 | 15 | 7 | 18 | 12 | 19 | 6 | 34 | 11 | 25 | 7 |
| 5 | 21 | 7 | 10 | 6 | 20 | 11 | 20 | 5 | 36 | 8 | 27 | 6 |
| 6 | 14 | 5 | 20 | 5 | 16 | 10 | 32 | 8 | 32 | 9 | 28 | 8 |
| 7 | 11 | 8 | 15 | 4 | 26 | 7 | 22 | 11 | 29 | 7 | 31 | 9 |
| 8 | 25 | 9 | 16 | 6 | 24 | 8 | 24 | 11 | 21 | 12 | 30 | 10 |
| 9 | 27 | 6 | 17 | 7 | 25 | 6 | 19 | 11 | 25 | 6 | 29 | 11 |
| 10 | 28 | 8 | 13 | 8 | 20 | 9 | 20 | 5 | 27 | 9 | 28 | 10 |
| 11 | 29 | 9 | 21 | 9 | 31 | 9 | 31 | 6 | 28 | 7 | 29 | 9 |
| 12 | 30 | 11 | 12 | 11 | 33 | 11 | 21 | 7 | 32 | 8 | 30 | 9 |
| 13 | 31 | 10 | 13 | 5 | 32 | 9 | 24 | 8 | 31 | 11 | 31 | 8 |
| 14 | 33 | 5 | 18 | 11 | 37 | 6 | 21 | 9 | 20 | 10 | 33 | 7 |
| 15 | 35 | 6 | 19 | 10 | 30 | 8 | 22 | 7 | 29 | 8 | 36 | 9 |
| 16 | 32 | 9 | 16 | 6 | 28 | 5 | 19 | 6 | 28 | 9 | 35 | 6 |
| 17 | 25 | 6 | 17 | 7 | 29 | 9 | 20 | 5 | 19 | 7 | 19 | 11 |
| 18 | 20 | 7 | 13 | 11 | 26 | 4 | 21 | 7 | 27 | 12 | 20 | 8 |
| 19 | 21 | 8 | 16 | 10 | 28 | 7 | 23 | 8 | 26 | 9 | 23 | 6 |
| 20 | 23 | 10 | 17 | 9 | 23 | 8 | 22 | 3 | 21 | 8 | 26 | 9 |
| 21 | 30 | 4 | 18 | 6 | 22 | 10 | 21 | 7 | 22 | 7 | 30 | 7 |
| 22 | 28 | 8 | 14 | 8 | 21 | 7 | 23 | 6 | 27 | 9 | 33 | 7 |
| 23 | 27 | 7 | 16 | 11 | 28 | 10 | 23 | 5 | 26 | 9 | 31 | 8 |
| 24 | 25 | 11 | 17 | 11 | 29 | 10 | 27 | 8 | 23 | 12 | 30 | 7 |
| 25 | 23 | 7 | 18 | 12 | 30 | 6 | 30 | 9 | 26 | 7 | 32 | 6 |
| 26 | 21 | 9 | 18 | 7 | 31 | 7 | 31 | 9 | 28 | 8 | 33 | 8 |
| 27 | 30 | 8 | 18 | 9 | 32 | 5 | 35 | 8 | 32 | 9 | 38 | 8 |
| 28 | 32 | 5 | 19 | 5 | 33 | 8 | 33 | 7 | 40 | 6 | 40 | 9 |
| 29 | 33 | 9 | 21 | 9 | 31 | 9 | 25 | 8 | 32 | 9 | 41 | 10 |
| 30 | 29 | 6 | 22 | 8 | 21 | 9 | 17 | 9 | 38 | 9 | 26 | 9 |
| 31 | 30 | 7 | 21 | 10 | 29 | 7 | 32 | 10 | 39 | 7 | 23 | 8 |
| 32 | 26 | 8 | 23 | 11 | 30 | 8 | 33 | 12 | 29 | 7 | 28 | 8 |
| max | 35 | 11 | 23 | 12 | 37 | 12 | 35 | 12 | 40 | 12 | 41 | 11 |
| min | 11 | 4 | 5 | 4 | 15 | 4 | 13 | 3 | 19 | 6 | 19 | 6 |
| ave | 26.1 | 7.5 | 16.3 | 7.9 | 26.0 | 7.9 | 23.6 | 7.8 | 29.0 | 8.5 | 29.3 | 8.1 |
| σ | 5.47 | 1.87 | 3.83 | 2.40 | 5.83 | 2.03 | 5.71 | 2.09 | 5.49 | 1.74 | 5.31 | 1.39 |

Table indicates that the size of burr caused by punching never becomes larger than the thickness of the support base member 17a for use in the carriage drive circuit 17 (the burr is smaller than the thickness of the support base member 17a).

Thus, by setting the positions of the hanging portions 17-2 shown in FIG. 4 at positions in which they never meet each other when the support base member 17a is folded and overmore than needed, an influence received by the support base member 17a from the terminal 19 in a process of assembling the control circuit board 12 with the casing 11 cannot be neglected as described previously.

Figure 7:
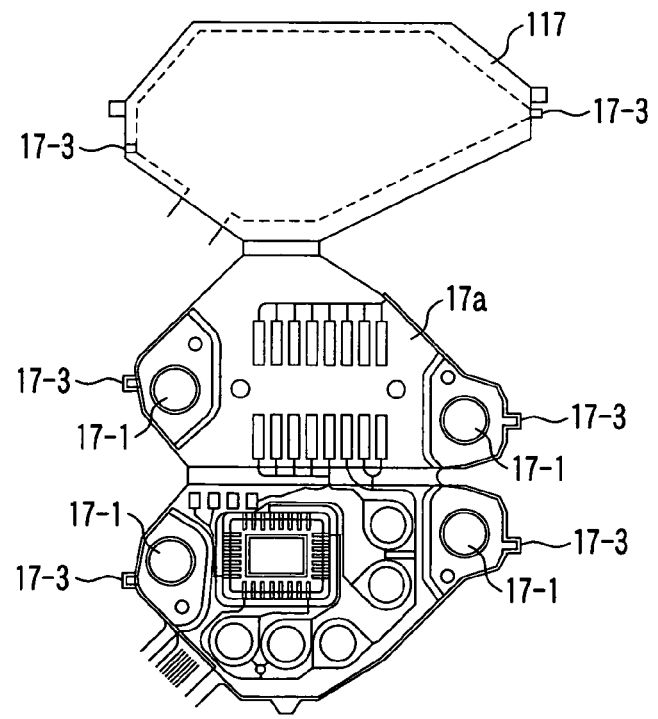
FIG. 7 is a schematic view for explaining another example of the feature in shape of the support base member of the carriage drive circuit shown in FIG. 4.

Thus, as shown in FIG. 7, part of the carrier member is punched out with the support base member 17a and after that, it is folded and overlapped with part of the support base member 17a. Because part of the support base member 17a folded in by this overlapping turns to three layers, stiffness capable of bearing a pressure received from the terminal 19 is obtained.

In the meantime, by optimizing the positions of the hanging portions 17-2 which connect the carrier member with the support base member 17a, the positional accuracy when folding the support base member 17a can be ensured as described previously with FIG. 6.

The present invention is not limited to the above-described embodiments and may be modified or changed in various ways within a scope not departing from the gist of the present invention when it is carried out. Further, the respective embodiments may be combined as appropriately as possible and in that case, an effect by the combination is obtained. For example, as for the recording and reproducing head, two or more of them may be provided per hard disk as required. Further, the size of the hard disk is not limited to 0.85 inches but needless to say, is permitted to be 1.8 inches (45.7 mm) or 2.5 inches (63.5 mm).

What is claimed is:

1. An information recording and reproducing unit comprising:
    a head unit configured to record information into a disc-like recording medium and reproducing information from the recording medium;
    a carriage member which positions the head unit at an arbitrary position in the radius direction of the recording medium;
    a carriage drive unit configured to change the position of the carriage member;
    a carriage drive circuit configured to supply a control signal for changing the position of the carriage member to the carriage drive unit;
    a connecting medium to connect the carriage drive unit with the carriage drive circuit such that the control signal can be supplied from the carriage drive circuit to the carriage drive unit; and
    a support base member to support the carriage drive circuit and the connecting medium so that the connecting medium is displaced on either (i) a same plane as a plane in which the carriage member rotates or (ii) a plane parallel to the plane in which the carriage member rotates, the support base member being formed integrally with the carrier member via a plurality of cutting areas which are to be cut out from the carrier member, folded and overlapped at a predetermined position in a state in which the support base member is cut out by punching, while when the support base member is folded and overlapped, the plurality of the cutting areas are provided at positions in which they avoid contact with each other.

2. The information recording and reproducing unit according to claim 1, wherein
    the support base member has a thickness adjusting area capable of providing such a height and stiffness which enable the connecting medium to be displaced on a same plane as a plane in which the carriage member rotates or a plane parallel to the plane in which the carriage member rotates.

3. An information recording and reproducing unit comprising:
    a head unit configured to record information into a disc-like recording medium and reproducing information from the recording medium;
    a carriage member which positions the head unit at an arbitrary position in a radius direction of the recording medium;
    a carriage drive unit configured to change to position of the carriage member;
    a carriage drive circuit configured to supply a control signal for changing the position of the carriage member to the carriage drive unit;
    a connecting medium to connect the carriage drive unit with the carriage drive circuit such that the control signal can be supplied from the carriage drive circuit to the carriage drive unit; and
    a support base member to support the carriage drive circuit and the connecting medium, the support base member in such a predetermined positional relation that a displacement of the connecting medium with a change in position of the carriage member does not affect the position of the carriage member, the support base member has a predetermined height which enables the connecting medium to be displaced eight (i) on a same plane as a plane in which the carriage member rotates or (ii) on a plane parallel to the plane in which the carriage member rotates, the support base member is formed integrally with the carrier member via a plurality of cutting areas which are to be cut out from the carrier member and folded and overlapped at a predetermined position in a state in which the support base member is cut out by punching, while when the support base member is folded and overlapped, the plurality of cutting areas are provided at a predetermined interval in a direction perpendicular to the folding position.

4. The information recording and reproducing unit according to claim 3, wherein
    the support base member has a thickness adjusting area capable of providing such a height and stiffness which enable the connecting medium to be displaced on a same plane as a plane in which the carriage member rotates or a plane parallel to the plane in which the carriage member rotates.

5. A circuit device comprising:
    a support base member for holding a circuit board for controlling a displacement originating from a rotation of a control object component and electronic components; and
    a connecting medium which connects electrically the control object component with the support base member and when the control object component rotates, is capable of being displaced on a same plane as a plane in which the control object component rotates or a plane parallel to the plane in which the control object component rotates, wherein
    the support base member is formed integrally with a carrier member via a plurality of cutting areas which are to be cut out from the carrier member and folded and overlapped at a predetermined position in a state in which the support base member is cut out by punching, thereby providing such a height which enables the connecting medium to be displaced on a same plane as a plane in the carriage member rotates or a plane parallel to the plane in which the carriage member rotates, and when the support base member is folded and overlapped, the plurality of cutting areas are specified at a predetermined interval in a direction perpendicular to the folding position.

6. The circuit device according to claim 5, wherein
    the support base member has a thickness adjusting area capable of providing such a height and stiffness which enable the connecting medium to be displaced on a same plane as a plane in which the control object component rotates or a plane parallel to the plane in which the control object component rotates.

7. The circuit device according to claim 5, wherein the connecting medium is used in a state in which it is folded at about 90° in a displacement interval between the control object component and the support base member and the displacement of the connecting medium is specified by a change in curvature of the connecting medium.

* * * * *